United States Patent
Christensen

(10) Patent No.: US 7,363,877 B2
(45) Date of Patent: Apr. 29, 2008

(54) METHOD OF EMPTYING A CONTAINER, AND USE OF THE METHOD

(75) Inventor: Kaj Christensen, Sæby (DK)

(73) Assignee: KM Fish Machinery, Dybvad (DK)

( * ) Notice: Subject to any disclaimer, the term of this patent is extended or adjusted under 35 U.S.C. 154(b) by 171 days.

(21) Appl. No.: 10/520,509

(22) PCT Filed: Jul. 8, 2003

(86) PCT No.: PCT/DK03/00478

§ 371 (c)(1),
(2), (4) Date: Mar. 21, 2005

(87) PCT Pub. No.: WO2004/007323

PCT Pub. Date: Jan. 22, 2004

(65) Prior Publication Data

US 2005/0155558 A1     Jul. 21, 2005

(30) Foreign Application Priority Data

Jul. 12, 2002   (DK) ................................ 2002 01094

(51) Int. Cl.
*A01K 61/00* (2006.01)
(52) U.S. Cl. ...................................... 119/207; 119/203
(58) Field of Classification Search ................ 119/207, 119/203, 204, 206, 209, 211, 215, 226, 245, 119/263, 264
See application file for complete search history.

(56) References Cited

U.S. PATENT DOCUMENTS

| | | | | |
|---|---|---|---|---|
| 1,512,591 A * | 10/1924 | Friedrichs | .................... | 119/203 |
| 2,302,336 A * | 11/1942 | MacDonald | ................. | 119/214 |
| 3,584,602 A * | 6/1971 | Stasio | ......................... | 119/252 |
| 3,726,251 A * | 4/1973 | Fremont | ..................... | 119/228 |
| 3,727,579 A * | 4/1973 | Lee | ............................. | 119/201 |
| 4,089,298 A * | 5/1978 | Wilson | ....................... | 119/201 |
| 4,182,267 A * | 1/1980 | Kominami et al. | ......... | 119/226 |
| 4,223,724 A * | 9/1980 | Levoni et al. | ................. | 166/68 |
| 4,357,902 A * | 11/1982 | Sheldon et al. | ............. | 119/202 |
| 4,414,919 A * | 11/1983 | Hess | ........................... | 119/259 |
| 4,455,966 A * | 6/1984 | Knowles | ..................... | 119/203 |
| 4,807,615 A * | 2/1989 | Nakagawa et al. | .... | 128/203.12 |
| 4,811,692 A * | 3/1989 | Malmbak-Kjeldsen | ...... | 119/202 |
| 4,815,411 A * | 3/1989 | Burgess | ....................... | 114/255 |
| 5,010,681 A * | 4/1991 | Cox, Jr. | .......................... | 43/57 |
| 5,290,437 A * | 3/1994 | Lin | ........................ | 210/167.01 |
| 5,353,745 A * | 10/1994 | Fahs, II | ....................... | 119/226 |
| 5,572,952 A * | 11/1996 | Manome | ..................... | 119/203 |
| 5,640,930 A * | 6/1997 | Kirby | .......................... | 119/263 |
| 5,690,054 A * | 11/1997 | Allen | .......................... | 119/259 |
| 5,695,654 A * | 12/1997 | Schultz | ....................... | 210/780 |
| 5,722,345 A * | 3/1998 | Nagaura | ..................... | 119/203 |
| 5,783,070 A * | 7/1998 | Lee | ......................... | 210/167.21 |
| 6,237,535 B1 * | 5/2001 | LaRosa | ...................... | 119/201 |
| 6,557,492 B1 * | 5/2003 | Robohm | ..................... | 119/203 |
| 6,666,168 B2 * | 12/2003 | Stutz et al. | ................. | 119/259 |

\* cited by examiner

*Primary Examiner*—Yvonne R. Abbott
(74) *Attorney, Agent, or Firm*—Dykema Gossett PLLC

(57) ABSTRACT

A method of emptying a large container of e.g. 12000 litres for the storage of fish, such as shellfish, e.g. shrimps, said container being emptied through a pipe in the container, air being supplied simultaneously with the emptying. The air is expediently supplied through/near the bottom of the container via holes which are provided in a pattern, or via a pipe distribution system which is lowered into the container. By supplying the air to the container during emptying it is ensured that the pipe, through which the fish are discharged from the container, does not clog, and that the contents are discharged as a uniformly distributed mass.

5 Claims, 1 Drawing Sheet

METHOD OF EMPTYING A CONTAINER, AND USE OF THE METHOD

BACKGROUND OF THE INVENTION

1. Field of the Invention

The invention relates to a method of emptying a container for the storage of fish, such shellfish, which are in the container together with water, the emptying taking place through a pipe provided in the bottom of the container, a medium being supplied into the container during emptying.

2. The Prior Art

Containers of this type, which may be made of plastics, are used for the ripening (maturing) of, e.g. shrimp. Typically, they have a size of 660 or 1000 litres and are emptied after ripening is completed simply by tilting.

For operational reasons, it is desirable to be able to ripening shrimp larger containers, e.g., containers having a capacity of 12000 litres. However, containers of this size are not easy to handle in connection with emptying where the container is to be tilted. It would therefore be an advantage if the container could be emptied through a pipe provided in the container. However, it has been found that, with such large containers for the storage of shrimp in water, emptying through the pipe will rapidly result in clogging, as the liquid will leave the container faster than the shrimp.

A container having a pipe at its bottom is known from DD Patent Specification No. 61451. In this method, a mixture of fish and water is pumped from a pipe located at the bottom of the container vertically upwards to a conveyor belt above the container, where water is conveyed back to the container, while the fish are transported further on.

Accordingly, it is an object of the invention to provide a method of emptying the initially mentioned large containers, which requires fewer installations, while maintaining a minimal risk of clogging.

SUMMARY OF THE INVENTION

The object of the invention is achieved by a method wherein fish and water are removed via a pipe at the bottom of the container and medium is concurrently supplied to the container, the medium being air which is supplied through holes provided near the bottom of the container.

Hereby, emptying takes place through the pipe as a very homogeneous uniform mass without the pipe becoming clogged.

As mentioned, the invention also relates to use of the method.

BRIEF DESCRIPTION OF THE DRAWINGS

The invention will now be explained more fully with reference to the drawings, in which;

FIG. 1 shows the container according to the invention seen from the side in cross-section, while

DETAILED DESCRIPTION OF THE INVENTION

Figure 1:
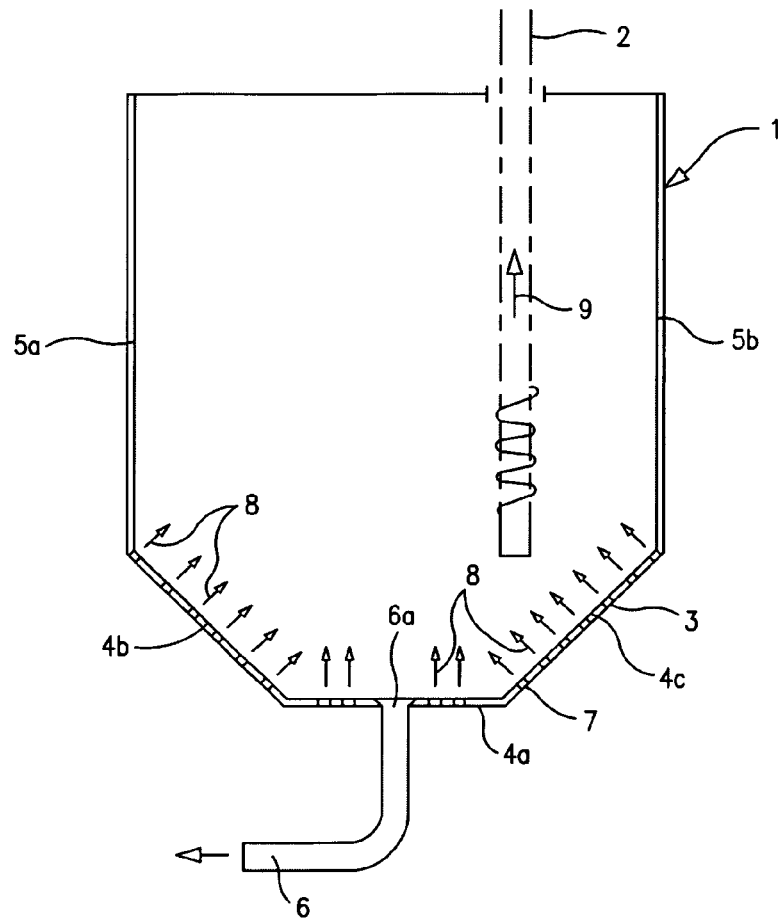

In FIG. 1, a container according to the invention is generally designated 1. As will be seen, the shown container has vertical side walls 5a, 5b, bottom wall 4a and inclined walls 4b, 4c which extend from the bottom wall to the side walls 5a, 5b. A pipe 6 is connected to the bottom 4 at inlet opening 4a, the pipe being intended for discharging, e.g., shrimp admixed with ice/water.

With a view to avoid clogging of the container, the bottom and optionally the inclined walls are formed with holes 3, 7 through which a medium, such as air may be conveyed, indicated e.g., by the reference numeral 8. The holes are located on opposite sides of inlet opening 4a and are located along the length of the (elongated) container.

Figure 2:
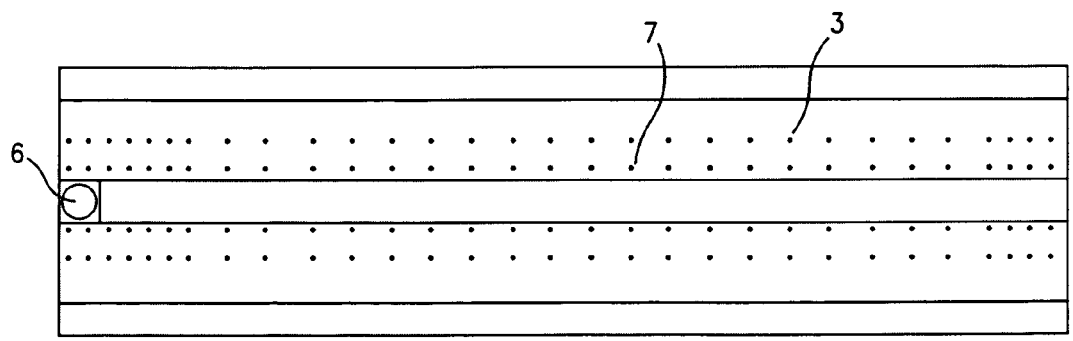
FIG. 2 shows the right-hand side of the container bottom seen from below relative to FIG. 1.

As will be seen in FIG. 2, the holes are here formed in a pattern which consists of two rows of holes 3, 7. These holes may be surrounded by a wall (not shown), thereby creating a cavity through which a pipe stub may be connected for the admission of a medium, such as water or air under pressure.

Alternatively, a pipe distribution system (not shown) may be lowered into the container for the supply of water or air under pressure, which may e.g. be an advantage if existing containers are to be upgraded.

Instead of a pipe or hose 6 connected to the bottom wall 4a the pipe or the hose may be disposed inside the container, as shown by the reference numeral 2.

When the contents of the container are to be emptied, water or air is optionally supplied via the hole-shaped pattern. It is ensured hereby that the pipe 2 of the container does not clog when its contents are discharged from the pipe 2 in the direction of the arrow 9.

The rate of this discharge may generally be increased if suction is applied to the pipe 2.

The container may be made of plastics or metal and have a size of e.g. 12000 litres.

The invention claimed is:

1. A method of maturing fish within a container which comprises the steps of
   (a) providing a container having a bottom wall, a discharge pipe connected to the bottom wall at an outlet opening, and holes in the bottom wall on opposite sides of the outlet opening for the ingress of air,
   (b) adding fish and water to said container and maturing said fish in said container, and
   (c) removing matured fish and water from said container through said discharge pipe while supplying air into said container through said holes to prevent clogging of said discharge pipe.

2. A method according to claim 1, wherein said container is elongated.

3. A method according to claim 2, wherein the holes of said container are aligned along at least one imaginary straight line.

4. A method according to claim 1, wherein said container includes side walls and respective inclined walls which extend between said bottom wall and said side walls, said inclined walls including holes therein, and including the step of supplying air into said container through the holes in said inclined walls.

5. A method of maturing fish within a container which comprises the steps of
   (a) providing a container which includes holes in a bottom wall thereof for ingress of air,
   (b) adding fish and water to said container and maturing said fish in said container,
   (c) inserting a discharge pipe into said container so that an inlet opening thereof is located above said bottom of said container, and
   (d) removing matured fish and water from said container through said discharge pipe while supplying air into said container through said holes to prevent clogging of said discharge pipe.

* * * * *